No. 12,565.
REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 1.
Fig. I.
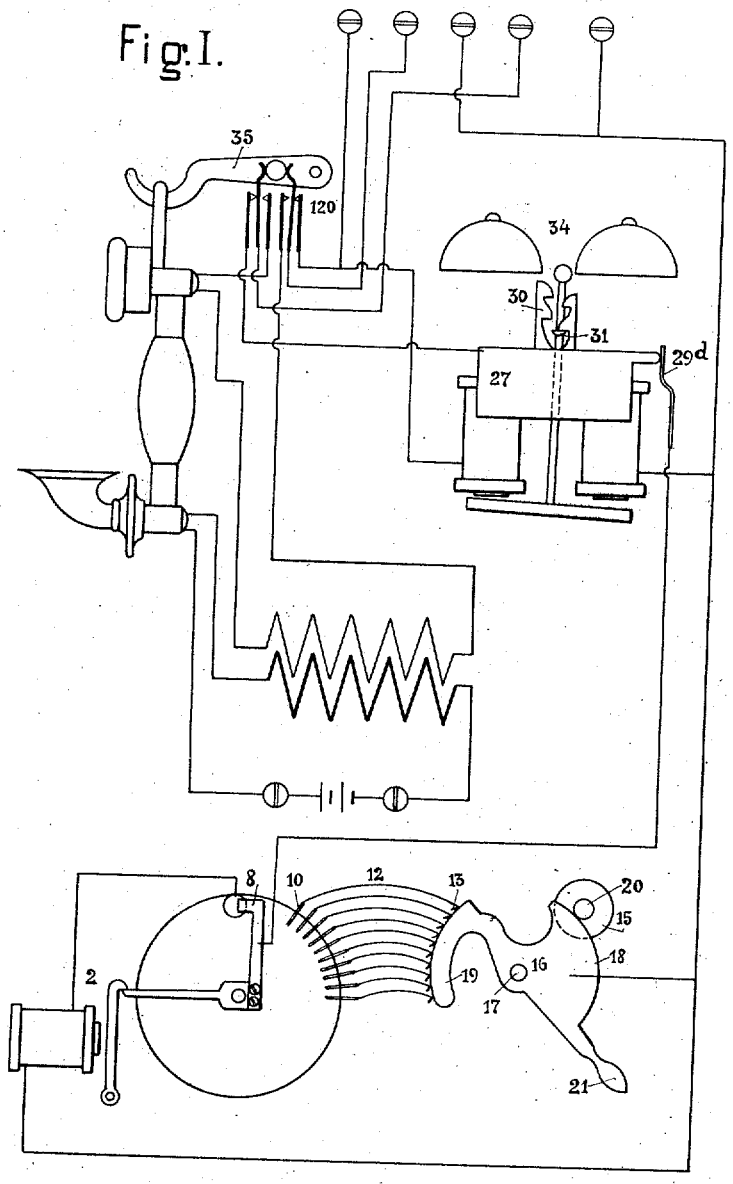
Witnesses:
Edwin L. Yewell.
F. T. Chapman
Inventor:
Arthur T. M. Thomson
By Lyons & Bissing.
Attorneys.

No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 2.
Fig. II.
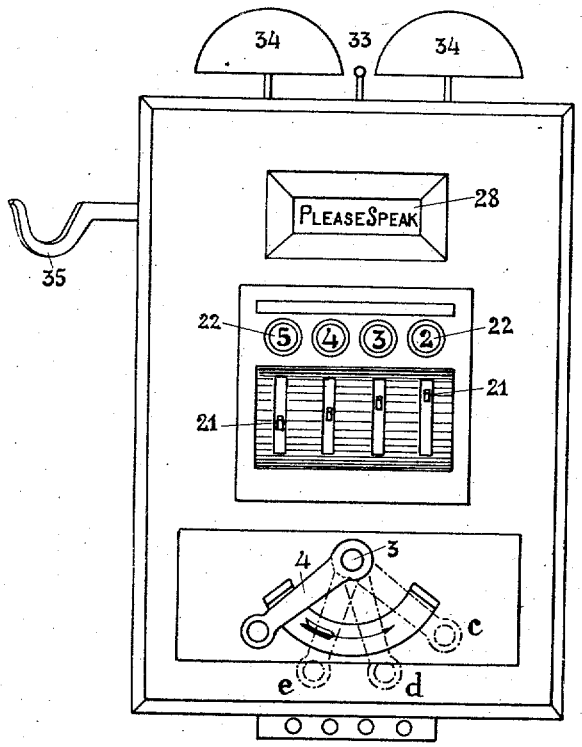
Witnesses:
Edwin L. Yewell.
F. T. Chapman.
Inventor:
Arthur T. M. Thomson,
By
Lyons & Rissing.
Attorneys.

No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 3.
Fig. IV.
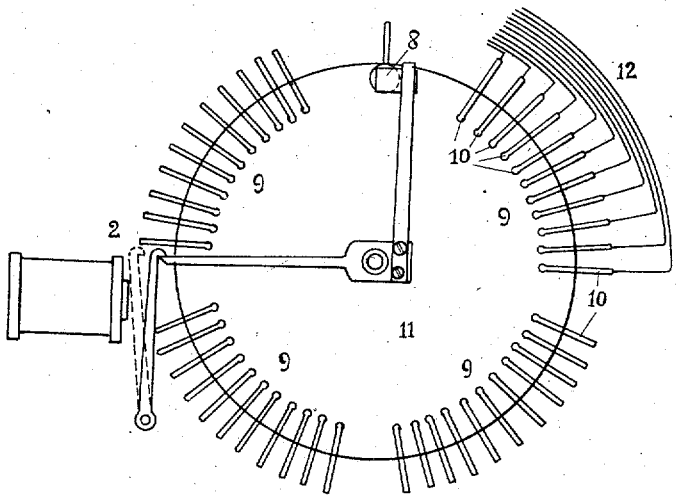
Fig. III.
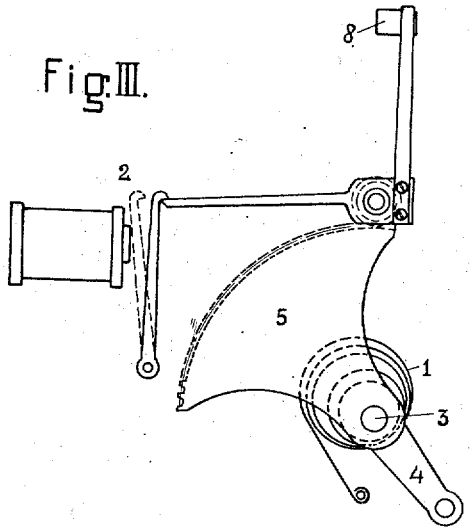
Witnesses:
Edwin L. Yewell,
H. T. Chapman.
Inventor:
Arthur T. M. Thomson
By Lyons & Bissing.
Attorneys.

No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 4.
Fig. V.
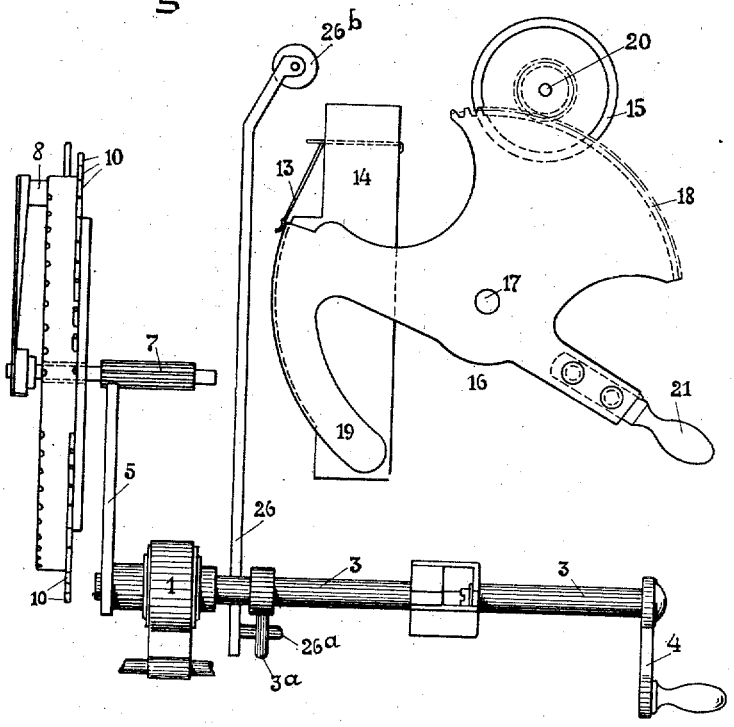
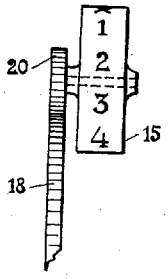
Fig. VI.
Witnesses:
Edwin L. Jewell,
F. T. Chapman.
Inventor:
Arthur T. M. Thomson
By Lyons & Bissing.
Attorneys.

No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 5.
Fig. XXX.
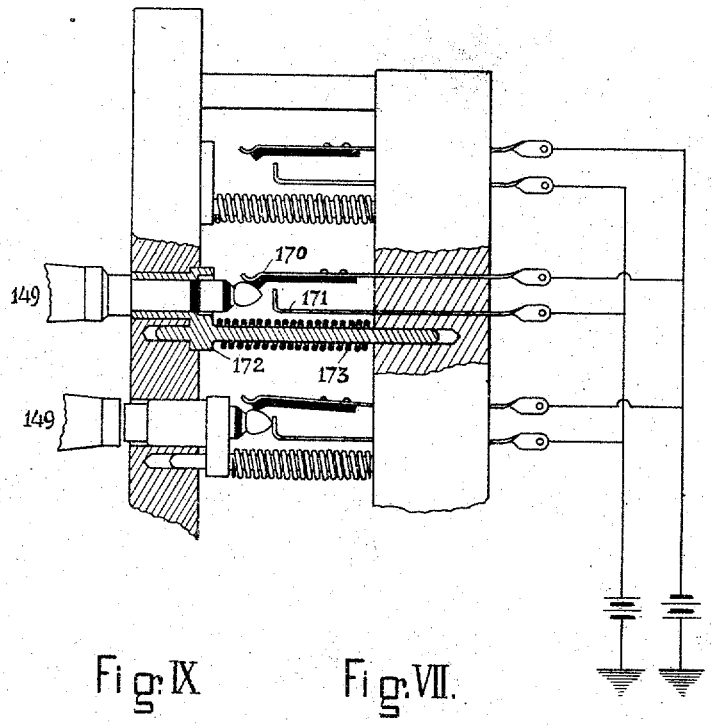
Fig. IX.
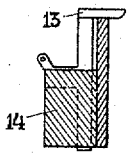
Fig. VII.
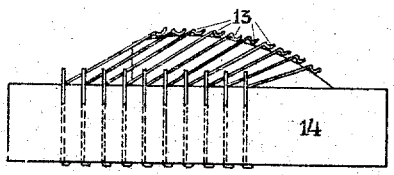
Fig. VIII
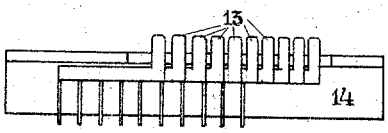
Witnesses.
Edwin L. Yewell.
F. T. Chapman.
Inventor,
Arthur T. M. Thomson
By Lyons & Bissing.
Attorneys.

No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 6.
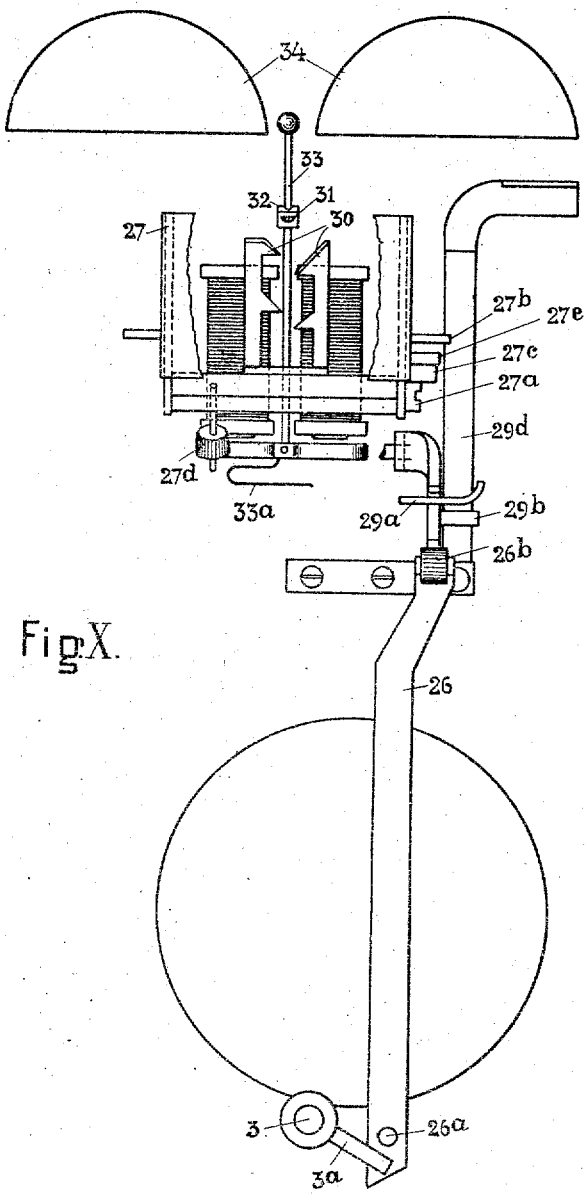
Fig. X.
Witnesses:
Edwin L. Jewell,
F. T. Chapman,
Inventor:
Arthur T. M. Thomson
By Lyons & Biesing.
Attorneys.

No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 7.
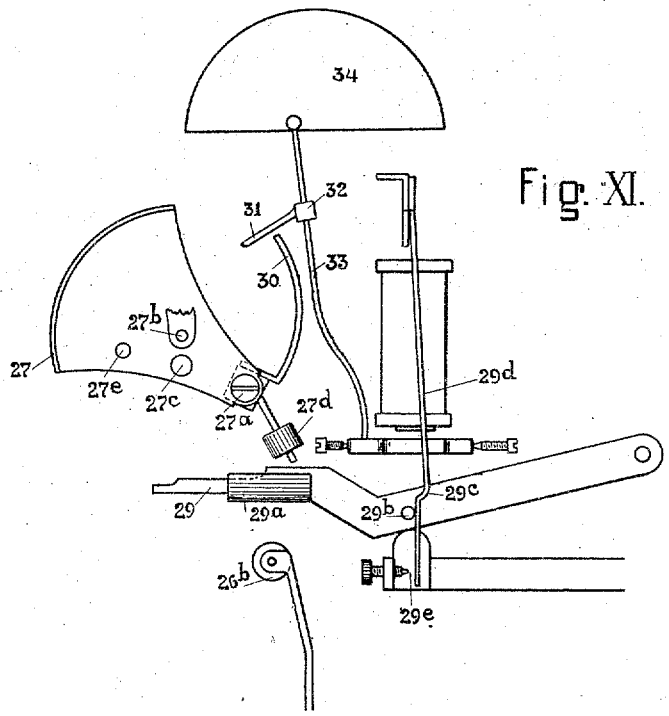
Fig. XI.
Fig. XIV.
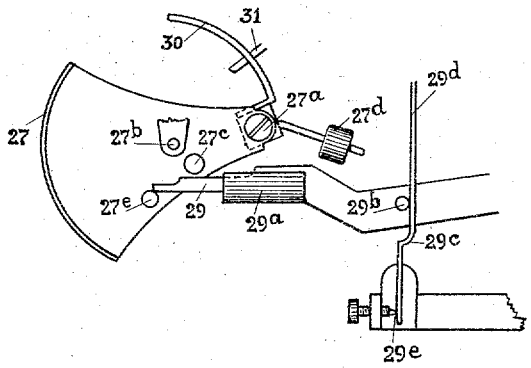
Witnesses,
Edwin L. Jewell,
F. T. Chapman.
Inventor:
Arthur T. M. Thomson
By Lyons & Bissing.
Attorneys No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 8.
Fig. XII.
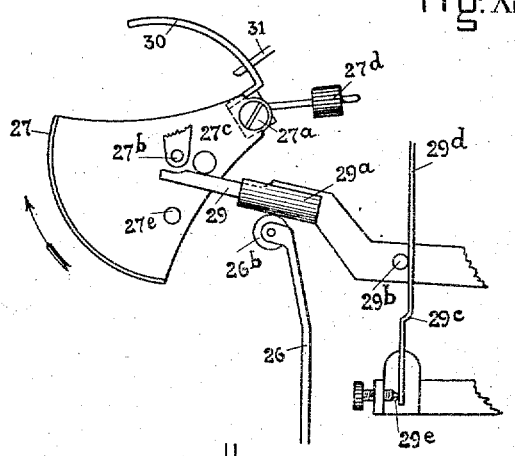
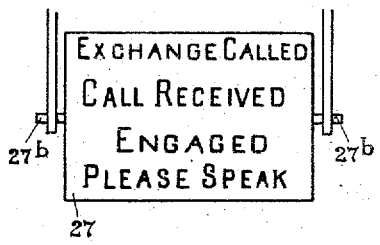
Fig. XIII.
Fig. XV.
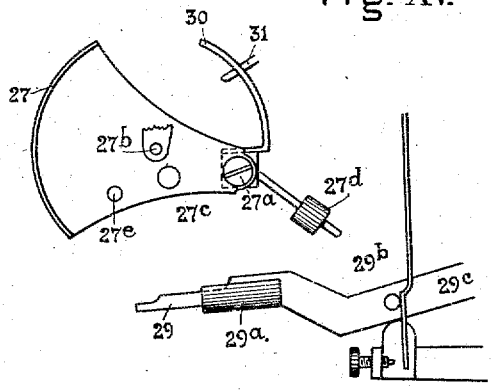
Witnesses:
Edwin L. Jewell.
F. T. Chapman.
Inventor.
Arthur T. M. Thomson,
By Lyons & Bissing.
Attorneys.

No. 12,565.
REISSUED NOV. 20, 1906.
A. T. M. THOMSON.
SEMI-AUTOMATIC TELEPHONE EXCHANGE SYSTEM.
APPLICATION FILED MAY 2, 1906.
16 SHEETS—SHEET 9.
Fig. XVI.
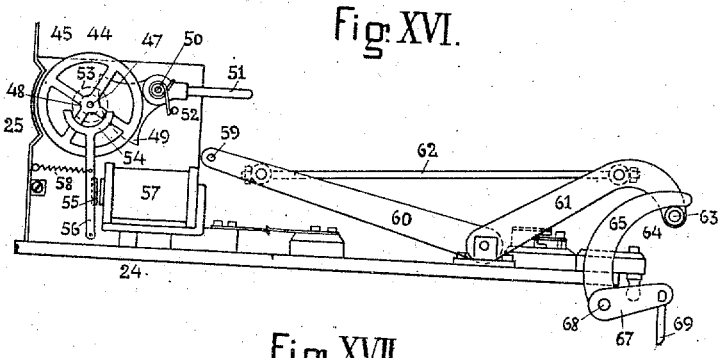
Fig. XVII.
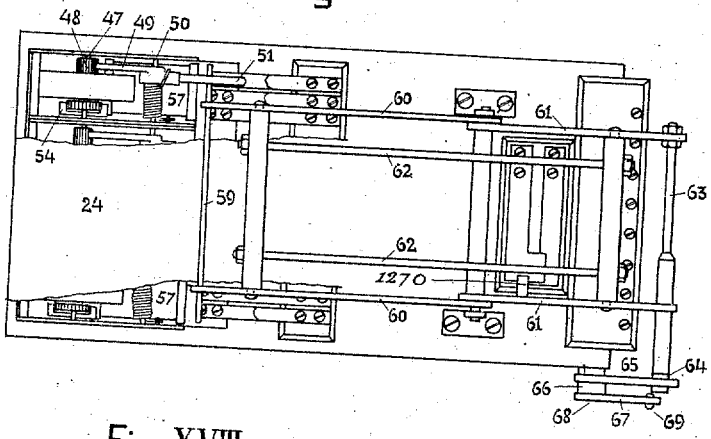
Fig. XVIII.
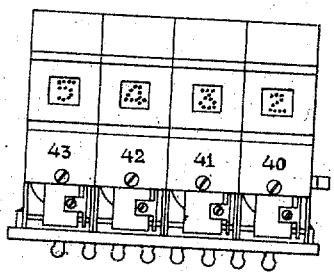
Fig. XIX.
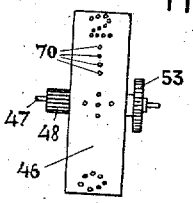
Witnesses,
Edwin L. Jewell
F. T. Chapman
Inventor,
Arthur T. M. Thomson,
By Lyons & Vissing.
Attorneys No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 10.
Fig. XX.
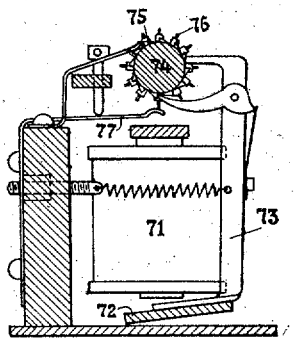
Fig. XXI.
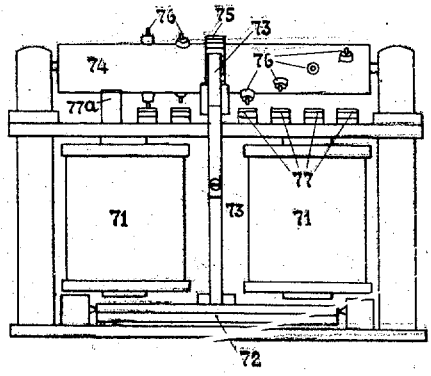
Fig. XXII.
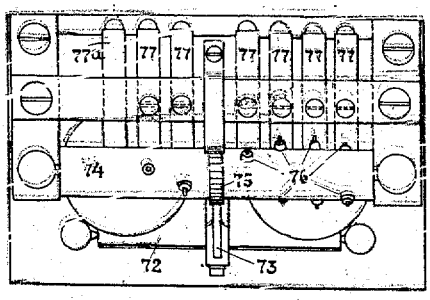
Witnesses:
Edwin L. Jewell,
F. T. Chapman.
Inventor:
Arthur T. M. Thomson
By Lyons & Bissing,
Attorneys.

No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 11.
Fig. XXIII.
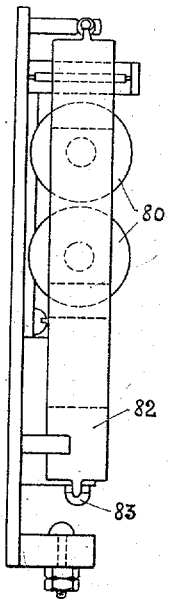
Fig. XXIV.
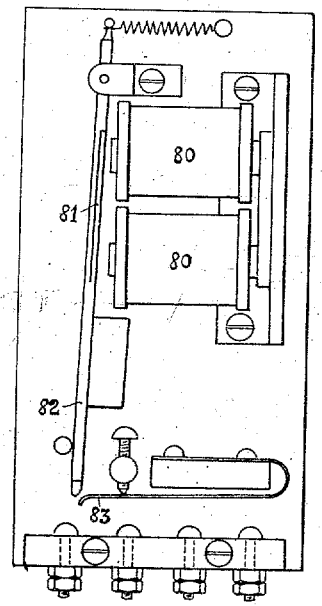
Witnesses:
Edwin L. Jewell
H. T. Chapman
Inventor,
Arthur T. M. Thomson,
By Lyons & Bissing.
Attorneys.

No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 12.
Fig: XXV.
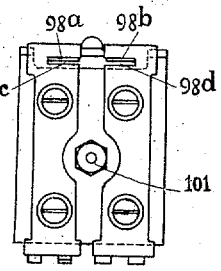
Fig: XXVI.
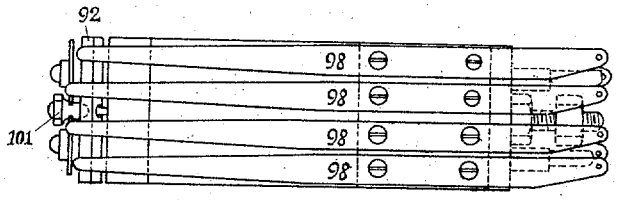
Fig: XXVII.
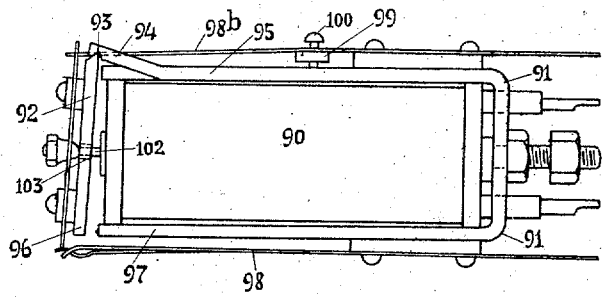
Witnesses:
Edwin L. Yeiwell,
F. T. Chapman
Inventor:
Arthur T. M. Thomson,
By Lyons & Bissing,
Attorneys.

No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 13.
Fig. XXVIII.
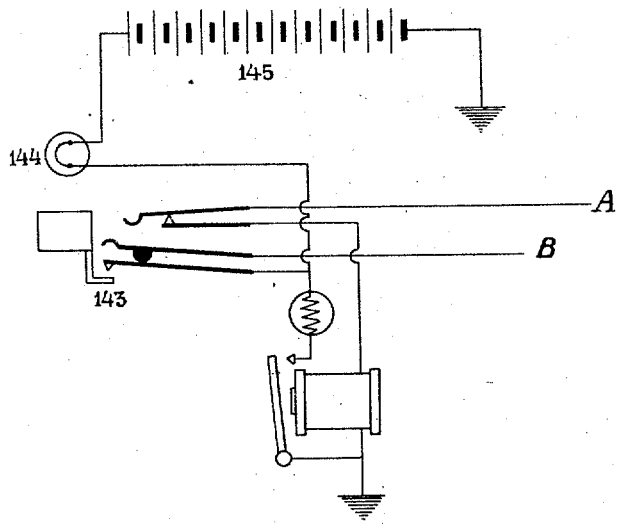
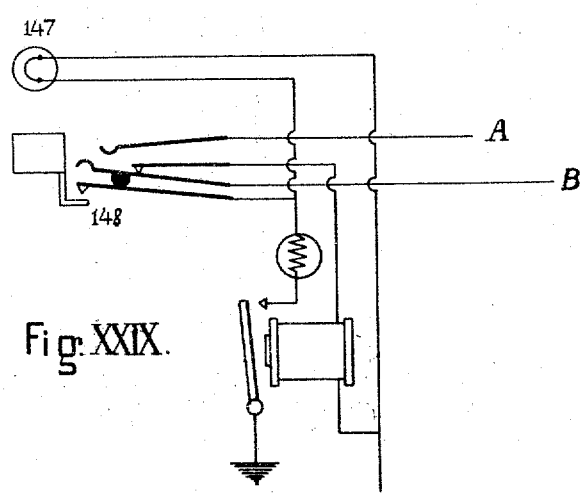
Fig. XXIX.
Witnesses:
Edwin L. Yewell,
H. T. Chapman,
Inventor:
Arthur T. M. Thomson,
By Lyons & Rissing.
Attorneys.

No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 14.
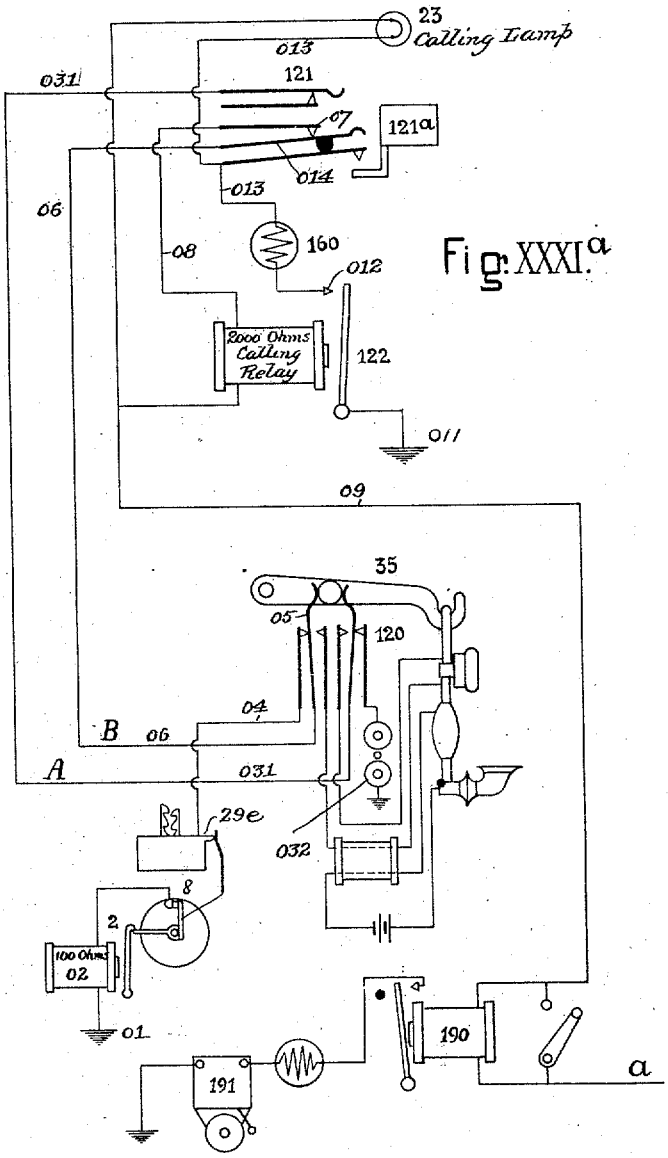
Fig. XXXI.a
Witnesses,
Edwin L. Yewell
F. T. Chapman,
Inventor,
Arthur T. M. Thomson,
By Lyons & Bissing.
Attorneys No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 15.
Fig. XXXI.b
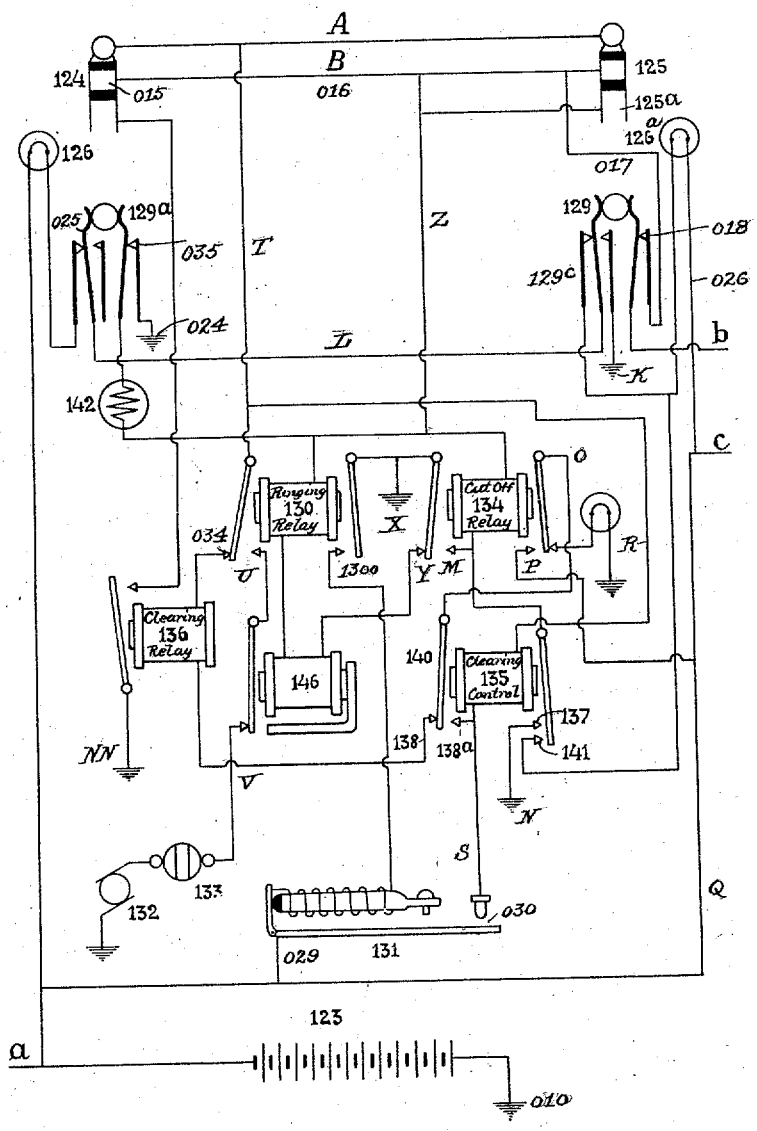
Witnesses:
Edwin L. Jewell
F. T. Chapman
Inventor:
Arthur T. M. Thomson,
By Lyons & Bissing.
attorneys.

No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 16.
Fig. XXXI.c
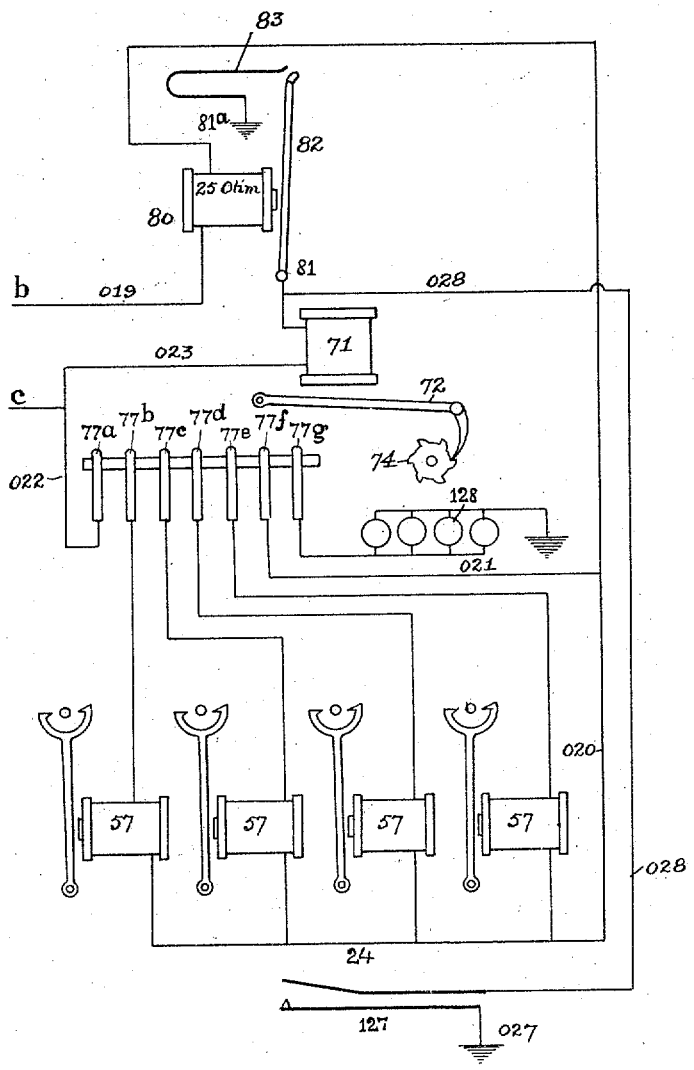
Witnesses,
Edwin L. Yewell.
F. T. Chapman.
Inventor,
Arthur T. M. Thomson,
By Lyons & Bissing.
Attorneys.

No. 12,565 REISSUED NOV. 20, 1906.
A. T. M. THOMSON.
SEMI-AUTOMATIC TELEPHONE EXCHANGE SYSTEM.
APPLICATION FILED MAY 2, 1906.
19 SHEETS—SHEET 17.
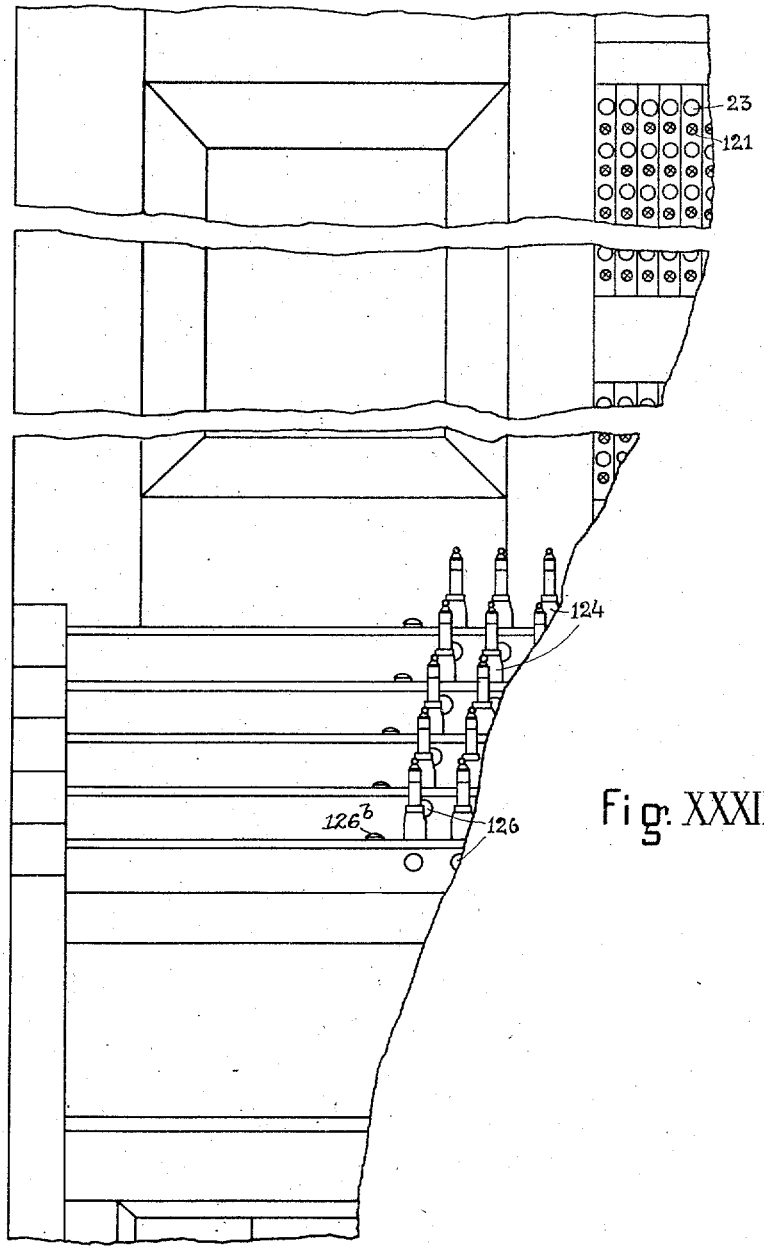
Fig. XXXII.a
Witnesses,
Edwin L. Yewell,
F. T. Chapman,
Inventor,
Arthur T. M. Thomson,
By Lyons & Bissing.
Attorneys.

No. 12,565. REISSUED NOV. 20, 1906.
A. T. M. THOMSON.
SEMI-AUTOMATIC TELEPHONE EXCHANGE SYSTEM.
APPLICATION FILED MAY 2, 1906.
18 SHEETS—SHEET 18.
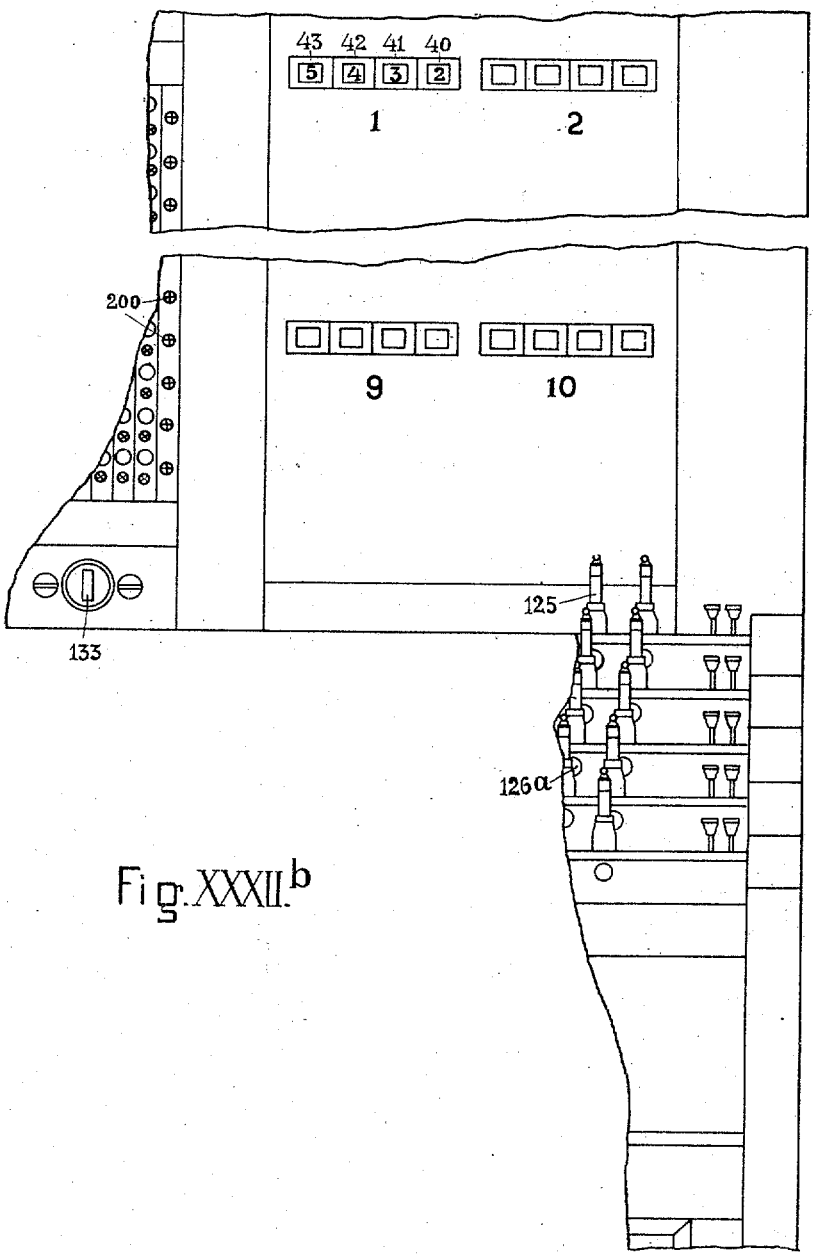
Fig. XXXII.b
Witnesses,
Edwin L. Jewell
H. T. Chapman.
Inventor,
Arthur T. M. Thomson,
By Lyons & Bissing,
Attorneys.

UNITED STATES PATENT OFFICE.

ARTHUR T. M. THOMSON, OF LONDON, ENGLAND.

SEMI-AUTOMATIC TELEPHONE-EXCHANGE SYSTEM.

No. 12,565. Specification of Reissued Letters Patent. Reissued Nov. 20, 1906.

Original No. 809,232, dated January 2, 1906. Application for reissue filed May 2, 1906. Serial No. 314,898.

*To all whom it may concern:*

Be it known that I, ARTHUR T. M. THOMSON, a subject of the King of Great Britain, and a resident of London, England, have invented a certain new and useful Improvement in Semi-Automatic Telephone-Exchange Systems, of which the following is a specification.

My invention relates to telephonic exchange systems of the semi-automatic type—that is to say, the type in which the connection and disconnection of subscribers' lines at the exchange is effected by means of human operators and in which there is no verbal communication or necessary verbal communication between the subscribers and operators.

An important feature in my invention is the subscriber's instrument. By its means when the subscriber, having set his instrument in such a manner or to such a position that when transmission to the exchange takes place the number or other indication which corresponds with that manner or position is exhibited or recorded at the exchange it stores up energy by which the "call"—that is to say, the transmission of the number of other indication—can be repeated one or more times, as the operator may desire. One great drawback in previously-devised semi-automatic systems is thus overcome. This drawback was that when a mistake was made or doubt entertained by the operators on receiving the call there was no way of ascertaining the correct call without great loss of time and the employment of special means for the purpose. The operators had therefore to be provided with telephones, so as to be able to place themselves in telephonic communication with the calling subscriber, in which latter case not only was time lost, but the system ceased for the time being to be semi-automatic. By my invention, however, no telephones need be employed at the exchange, and in the event of mistake or doubt the operator after the call need only close the calling-subscriber's circuit through the exchange-indicator in order to have the call repeated (and more than once, if necessary) by means of the energy stored up by the calling subscriber. This storing up of energy may be effected by a mere manual pressure or movement in one direction.

Figure I shows the circuits and apparatus in diagram of the subscriber's instrument. Fig. II shows the face view of the subscriber's instrument. Fig. III shows the winding-sector and detent-magnet of the subscriber's instrument. Fig. IV shows the contacts and revolving arm of subscriber's instrument. Fig. V shows a detail of the mechanism of the subscriber's instrument. Fig. VI shows one of the indicating-disks of the subscriber's instrument. Figs. VII, VIII, and IX show the mechanical construction of the contacts in the subscriber's instrument. Figs. X, XI, XII, XIII, XIV, XV show different positions of the parts of the subscriber's instrument which operate the annunciator therein. Figs. XVI, XVII, XVIII, and XIX show, respectively, a side elevation, plan, end elevation, and a detail of the numerical indicator at the central office. Figs. XX, XXI, XXII show a vertical cross-section, end elevation, and plan, respectively, of the commutator-relay at the central office. Figs. XXIII and XXIV show an end and side elevation, respectively, of the retarding-relay at the central office. Figs. XXV, XXVI, and XXVII show an end elevation, plan, and side elevation of a preferred form of cord-circuit relay. Fig. XXVIII shows the circuits for an outgoing trunk-line. Fig. XXIX shows the circuit for an incoming trunk-line. Fig. XXX shows a projecting jack or device to send a current first of one and then of another polarity through the tip of the inserted plug. Figs. XXXI[a], XXXI[b], XXXI[c] should be placed side by side, when they show the circuits in diagram of the entire system. Figs. XXXII[a] and XXXII[b], which should be read together, show the switchboard.

I shall now proceed to describe my subscriber's instrument, (shown diagrammatically in Fig. I,) and then I shall describe the appliances which I employ at the exchange in connection therewith.

*The subscriber's instrument,* (Figs. I to XV.) In Figs. II to XV, I show my preferred form of subscriber's instrument. Here I store up energy by winding up a clock-spring 1, which is maintained in its wound position by a detent 2. For the purpose of such winding up the spring is attached in a well-known manner to a cranked spindle 3, Fig. V, (the crank 4 of which is on the outside of the case,) upon which spindle is mounted a toothed sector 5, driving a pinion 7, connected with the sweeping contact-brush 8, hereinafter mentioned. Movement of this crank through a definite angular distance winds up the said spring.

The function of this spring is to rotate a sweeping contact-brush 8 over four series 9 of contacts 10, (hereinafter termed the "commutator-contacts,") arranged in a circle on the face of an insulating-disk 11. From the said contacts 10 wires 12 lead to other contacts 13, (hereinafter termed the "switch-contacts,") arranged upon the edges of insulating-segments 14, each series of switch-contacts corresponding with a series of commutator-contacts being on a separate segment. Over and close to each segment is a number-wheel 15—that is to say, a wheel having numbers from "1" to "10" marked round its edge. For each segment and number-wheel there is a three-armed lever 16, mounted loosely on a spindle 17. The first of the three arms of each lever bears an arc-shaped rack 18, and the second arm bears an arc-shaped contacting piece 19. Each arc-shaped rack engages with a pinion 20 on a number-wheel 15, and each arc-shaped contacting piece engages with an increasing number of contacts 13, according to the greater angular distance through which it is moved. The third arm 21 of the said lever projects to the outside of the case, so as to serve as a handle for producing the angular movement of the lever 16. Movement of this lever therefore through any given angular distance determines the number of contacts closed and the numeral on the number-wheel displayed through an opening 22 in the case. For an exchange for one to ten thousand subscribers I employ four segments with one series of switch-contacts on each, four number-wheels, one for each segment, four levers, and four series of commutator-contacts, all as shown. One of each of the parts just named is for units, the second for tens, the third for hundreds, and the fourth for thousands. Now assuming that the calling subscriber wishes to speak with another subscriber whose number is "5432," he will move the handle-arm of a lever 16 until the number "5" of the thousands number-wheel appears through an opening 22 in the case, and he will similarly move the handle-arms of the levers 16 till the number "4" shows on the hundreds-wheel, the number "3" on the tens-wheel, and the number "2" on the units-wheel, as is shown in Fig. II. These movements will move the arc-shaped contacting pieces so as to close the circuit through a number of contacts corresponding with the number shown by the number-wheels, and, as has been previously stated, these contacts are connected to corresponding commutator-contacts. The calling subscriber then moves his crank-handle to its extreme position on the right, (see position *c*, Fig. II,) so as to fully wind up and store energy in the clock-spring 1, and in so doing he earths one of his exchange-wires, hereinafter termed the "B" line, through a suitable contact at 29$^{e}$, Figs. XII and XXXI$^{a}$, and gives a signal at the exchange, as will hereinafter appear. A preferable exchange signaling device for this purpose is a glow-lamp 23 (see Fig. XXXI$^{a}$) on the switchboard, which for distinction term the "calling-lamp." The operator receiving this signal now connects a numerical indicating device 24 (see Figs. XVI, XVII, XVIII) with the calling-subscriber's line in the manner hereinafter to be described and transmits a current along the line herein termed the "B" line. This actuates the electromagnetic detent 2 in the subscriber's instrument, so as to free the sweeping contact-brush 8, which now travels over the commutator-contacts 10, and as it passes over each causes an impulse to pass through the numerical indicator 24. The number of contacts thus closed determines the position to which each drum or indicating-wheel 25 (see Figs. XVI to XIX) on the numerical indicator is moved, and this numerical indicator, as will be hereinafter described, is adapted to exhibit numbers corresponding with those shown by the number-wheels 15 of the calling-subscriber's instrument hereinbefore mentioned. The operator seeing by the numerical indicator which subscriber it is desired shall be put in communication with the calling subscriber makes the necessary connections, as will be hereinafter described. Should the operator be in any doubt as to the call received or should the action of the numerical indicator indicate the possibility of an error having been made, then all the operator has to do is to transmit another impulse over the calling-subscriber's line in the same manner as before. This will again remove the electromagnetic detent 2, (returned to its detaining position immediately after the first impulse,) so that the clock-spring 1 will again cause the sweeping contact-brush 8 to move over the commutator-contacts 10 and repeat the transmission of impulses to the numerical indicator 24 at the exchange. Such repetition can be made as long as there is sufficient energy stored up in the clock-spring to cause the sweeping brush to move over the necessary commutator-contacts. It will thus be seen that it is not the subscriber who transmits the call to the exchange, but that it is the exchange operator who ascertains the call for herself by transmitting an impulse to the calling-subscriber's instrument to release the detent and that what the subscriber does is simply to place the parts of his own instrument so as to correspond with the number of the subscriber with whom he wishes to talk and by a single movement to transmit a single impulse to the exchange and store up the engery, by means of which the exchange operator can herself cause the call to be transmitted once or twice or more times, if desired.

The crank-spindle 3, hereinbefore referred to, may also serve to move a rod 26 or the like, and this either directly or indirectly, for the purpose of shifting an annunciator 27, designed to give any desired indications to the subscribers. This annunciator in the specific form under description is of the shape of a sector of a drum, with a number of announcements—such, for example, as "Exchange called," "Call received," "Engaged," "Please speak"—marked on its curved surface, and these announcements appear opposite a window 28 in the case one at a time. This annunciator is worked by a lever 29, actuated by the rod 26, which is in turn actuated by the crank-spindle 3, Fig. X. The annunciator bears a jaw-ladder 30, between the jaws of which works in zigzag fashion a pin or projection 31, mounted on the arm 32 of the call-bell lever 33 in such a manner that the movement of the call-bell lever moves the annunciator. When the calling subscriber has moved his crank-spindle so as to wind up the clock-spring (say in position *c* in Fig. II) and send an impulse to the exchange so as to light the calling-lamp 23 there, the annunciator shows "Exchange called." When the exchange replies and releases the detent, the winding-arbor rotates and lowers the rod or lever, which actuates the annunciator, and the annunciator shows "Call received." The calling subscriber, seeing this, waits for the bell 34 to ring, and on the operator ringing bell the annunciator is moved to "Please speak," when the subscriber takes his telephone off the hook 35 and converses. The action of the annunciator is more minutely described as follows: When the crank-spindle is moved to its extreme position, (see position *c* in Fig. II,) the pin $3^a$ of spindle 3, pressing on the pin $26^a$, placed at right angles above it, raises it and the vertical rod 26 to the highest position, as shown in Fig. XII. During this upward movement of the rod 26 the roller $26^b$ at its upper end presses upon the curved plate $29^a$ and raises lever 29, which again presses upon and raises the cylindrical screw-head $27^a$ on the sector and moves the latter round the center $27^b$ through a certain augular distance until lever 29 comes in contact with pin $27^c$, when the sector is moved through a still greater angular distance into the position shown in Fig. XII. This is the highest position of the rod 26 and lever 29 and the lowest of the face or curved part of the sector, and the indicator "Exchange called" is shown. When now the detent 2 is released, the spring 1 runs down and the rod 26 is lowered. Lever 29, being no longer supported by rod 26 and no longer supporting pin $27^c$, the counterweight $27^d$ moves the sector in the direction of the arrow until pin $27^e$ comes against and supports lever 29, Fig. XIV, while pin 31 is engaging the first tooth of the jaw-ladder, so as to prevent any further movement of the sector. The parts are now in the position shown in Fig. XIV, and the indication "Call received" is exhibited. Let us now assume that the called subscriber is engaged and that the operator desires to signal this fact to the calling subscriber. She sends a single impulse, (in the manner and by the means hereinafter described in connection with inserting the connecting-plug into the projecting-jack of Fig. XXX,) which in traversing the bell-magnet causes the latter to attract its armature from the biased position in which it is resting, the bias being produced by the spring $33^a$ into such a position that the pin 31 is removed from the first to the second tooth of the jaw-ladder, and the sector moves through another step and shows the indication "Engaged." Should, however, the called subscriber not be engaged, but be connected up, then the automatic ringing-key (thermal device 131, Fig. $XXXI^b$) sends impulses through the calling-subscriber's bell and the sector is moved on to the position shown in Fig. XI through the pin 31 being moved so as to let further teeth of the jaw-ladder pass. The indicator "Please speak" is now shown. It will be obvious that the above-mentioned movement of the sector is caused by the counterweight $27^d$, controlled by the jaw-ladder 30 and pin 31. As soon as the sector moves from the "Call-received" position lever 29 is no longer supported by pin $27^e$, but drops to its lowest position, as shown in Fig. XI. In so doing pin $29^b$ comes against the bend $29^c$ of spring $29^d$ and presses it to the right, so as to break the contact $29^e$, which is shown as made in Fig. XII. The effect of this is to disconnect the subscriber's "B" line from his signaling apparatus. I have stated that in signaling to the exchange the calling subscriber has moved his crank-arm to the position *c*, Fig. II, and that the exchange replies by releasing the detent 2. Spring 1 then runs down until the brush 8 has made a complete revolution and has returned to its original position, where it is stopped by the detent, no current now passing through the electromagnet of the latter. This brings the crank-arm 4 into the position *d* of Fig. II. Should the operator at the exchange desire a repetition of the call, she sends another impulse, as will be later described, which again releases the detent, the arm 8 makes another complete revolution, and crank-arm 4 is brought to position *e*. Should another repetition of the call be desired, the operation is repeated and crank-arm 4 is brought back to its original position, as shown in full lines in Fig. II.

*The numerical indicator*, (Figs. XVI, XVII, and XVIII.)—The numerical indicator hereinbefore mentioned and in the form preferred consists (see Figs. XVI, XVII, and XVIII) of four similar elements, one element 40 being for units, another, 41, for tens, a third, 42, for hundreds, and a fourth, 43, for thousands. Each of these elements embraces a drum 44, round the curved surface 45 of which is a series of numerals "1 2 3 4 5 6 7 8 9 0." In addition there is a zero-mark (a cross is a convenient mark for this) placed before the numeral "1" and a blank space 46 before the said zero-mark. (See Fig. XIX.) On the arbor 47 of this drum is a pinion 48, which meshes with a rack-sector 49, by means of which a spring actuating the drum is wound up and the drum rotated in one direction. This spring may be mounted on the arbor 47 with one end attached thereto and the other end attached to any convenient fixed part; but I prefer to mount it on the arbor 50, which bears the rack-sector 49, one end being attached to the arm 51 and the other end abutting against the stop 52. The arbor 47 also bears an escapement-wheel 53, and in operative proximity to this is a releasing-escapement 54, such that when the spring is wound or partially wound movement of the said escapement allows the spring to run down and the drum to be rotated thereby through a given angular distance. Movement of the said escapement is brought about electromagnetically by attaching an armature 55 to the arm 56 of the escapement 54, the said armature being placed opposite an electromagnet 57. A blade-spring or a helical 58 serves to remove the armature from the electromagnet when the latter is dead. The sector 49 is actuated by a lever 59 or key under the control of the operator, who after each indication has been made presses the said lever or key, rotates the sector, and winds up the spring to its full extent and moves the drum until the blank space coincides with the window of the indicator. This lever 59 consists of a frame embracing the two duplicated members 60 61, connected by the duplicated tie 62.

63 is a cross-arm having at one end the roller 64, over which is one end of an arm 65, whose other arm is riveted to the washer 66 and arm 67, the said parts 65, 66, and 67 rotating loosely on the arbor 68.

69 is a link passing to a key of any convenient form placed so as to be within easy reach of the operator. When the link is depressed to restore the drums, a projection 1270 on the member 61 closes contact between the springs 127. The effect of this is that the relay-magnet 71 is energized, which restores the commutator-shaft to its normal position, thereby repeating the numerical indication corresponding to that on the subscriber's transmitter, provided the plug 125 has been allowed to remain in its seat.

A convenient way of marking the numerals on the drum is by small perforations 70, so that when a small incandescent lamp is placed within the drum the numerals may be clearly indicated by the pencils of light passing through the said perforations.

*The commutator-relay*, (Figs, XX, XXI, XXII.)—In the cord-circuit between the subscriber's jack and the numerical indicator is a relay, which I term the "commutator-relay" and which is illustrated in Figs. XX, XXI, and XXII. This relay embraces in its preferred form a horseshoe-electromagnet 71, to the armature 72 of which is attached a lever and pawl 73, which drives a contact-barrel 74 by means of a ratchet-wheel 75. The contact-barrel consists of a cylinder of brass having projecting contact-pins 76 thereon, the said contact-pins passing diametrically through the cylinder and their ends projecting therefrom and each end being tipped with platinum. Contact-springs 77 are so arranged that the said pins make contact with them, such contacts being made as correspond with the position at any moment of the contact-pins. In the form at present under description there are seven contact-springs. The first of these, 77[a], is in permanent connection with the drum and with the cord-plugs. The others serve to make connection when in contact with their corresponding contact-pins on the drum with the cord-plugs, with the elements of the numerical indicator, and with the numerical-indicator lamps.

*The retarding-relay*, (Figs. XXIII and XXIV.)—For the purpose of preventing actuation of the commutator-relay by short impulses I insert between the numerical indicator and the commutator-relay what I may term a "retarding-relay" and which I show in Figs. XXIII and XXIV. In a preferred form this consists of a horseshoe-electromagnet 80, to the armature 81 of which is attached a weighted arm 82, the weighted arm carrying or moving (in the case illustrated moving and contacting with) a contact-spring 83. From the coils of the electromagnet a wire or wires extend to the common return of each element of the numerical indicator. The length and weight of the weighted arm are such as to prevent movement of the armature sufficient to open the contacts except when the impulses are of sufficient duration.

*The cord-circuit relays*, (Figs. XXV, XXVI, XXVII.)—In the cord-circuits I place relays, hereinafter termed the "cord-circuit" relays. Any convenient form of relay may be employed as a cord-circuit relay; but a preferred form is shown in Figs. XXV, XXVI, and XXVII. It consists of a straight electromagnet 90 in a U-shaped piece of soft iron 91, which serves with the armature 92 as a complete magnetic circuit. The armature is articulated in any convenient manner at one end 93 to the free end 94 of one of the limbs 95 of the U 91, while the other end 96 of the armature is in proximity to the free end of the other limb 97 of the U. Contact-springs 98 or conductors are attached to the two limbs of the U and to the armature and interlock in such a manner that two of these, $98^a$ and $98^b$, serve as springs to withdraw the armature when no current is passing through the electromagnet. This withdrawal is accomplished as follows: It will be seen that the two springs $98^a$ $98^b$ are bent downward and engage in the slots $98^c$ $98^d$. This bending takes place over the washer or separating-piece 99 of the adjusting-screw 100. This adjusting-screw is turned until a strain is put upon springs $98^a$ $98^b$, bending the latter, as shown in Fig. XXVII. The consequence is that a turning moment is put upon the armature 92 by means of the end springs bearing the slots $98^c$ $98^d$, so as to tend to move the said armature round the knife-edge pivot 93 and away from the electromagnet. The said strain tends to keep the armature away from the electromagnet. A limiting-stop 101 is attached to the armature end of the core of the electromagnet, and its shank 102 passes through an orifice 103 in the armature.

*Other central-office apparatus.*—For ringing purposes I find it convenient to use in connection with the cord-circuit relays thermostatic devices, as described in the complete specification accompanying my Letters Patent No. 712,619, dated November 4, 1902. Such a thermostatic device is shown at 131 in Fig. $XXXI^b$.

When the calling subscriber has sent an impulse to the exchange and has caused his calling-lamp to glow so that the first operator may know to insert the plug of a cord in his jack, it is necessary that the second operator should be notified. I effect this by mounting upon the cords what I term "cord-operated keys," as described in the complete specification accompanying my British Letters Patent No. 5,062 of 1901. The said cord-operated keys serve to close and to open circuit through the numerical indicator, through the supervisory lamp on the switchboard, and through the relay. This is shown at 129 and $129^a$ in Fig. $XXXI^b$.

When it is necessary to disconnect the calling-subscriber's line at the exchange, I signal the fact by passing a current through clearing-relays 136. (See Fig. $XXXI^b$.) These may be of any convenient known form and are used in the usual well-known way. With the clearing-relays I find it convenient to employ what I term "clearing control-relays" (preferably of cord-circuit form) 135, (see Fig. $XXXI^b$,) whose function is to suspend the action of the clearing-relays when there would be danger of the impulses which actuate the numerical indicator, causing the clearing-lamps to glow, and when such danger has passed and the numerical indicators are no longer actuated to put the clearing-relays into action, so that the clearing-currents may traverse the calling-lamps and enable these lamps to act now as clearing-lamps.

For the purpose of showing to the calling subscriber when the called line is engaged I employ in any convenient part of the switchboard a device which I shall hereinafter term the "projecting-jack" 200, as shown in Fig. $XXXII^b$. This embraces two ordinary jack-springs 170 171, placed one behind the other. In front of these is a guiding bush or washer 172, backed by a helical or other suitable spring 173. When the plug 149 is thrust through this guiding-bush to its full extent, (see the lower jack in Fig. XXX,) the backing-spring is compressed and the tip of the plug is in connection with the rear jack-spring 171 and its sleeve (in certain cases only) with the front jack-spring 170. When the thrust or pressure is removed, the backing-spring asserts itself and causes the plug to be projected forward until, as shown in the middle jack in the figure, contact with the rear spring 171 is broken and contact is now made between the front jack-spring 170 and the tip of the plug. In this position the backing-spring is fully extended, and the parts remain as stated until the plug is removed by the operator.

At the exchange the subscriber's line is connected to one "break-jack" only, as 121, (see Fig. XXXI,) and above or near this jack is its combined calling and clearing lamp 23, operated by a suitably-connected calling-relay 122. The subscribers' lines are divided into sections of one thousand, each being practically an exchange in itself. Each section is provided with incoming and outgoing trunks, (see Figs. XXIX and XXVIII,) and these trunks can of course be multiplied, if desired. A section of one thousand subscribers is designed under normal conditions to be operated by two operators; but a third may help, if desired. The operator on the left (called the "calling" or "No. 1" operator) attends to all calling-signals. The other operator, on the right, (called the "called" or "No. 2" operator,) reads the number wanted and completes the connection. A subscriber signals the fact that he wants connection by lighting the lamp 23 above his jack 121 in the manner hereinbefore mentioned when speaking of the subscriber's instrument. At this time there is no plug in his jack, but if his lamp lights when there is a plug in his jack the lighting of this lamp is a sign (as hereinafter described) that he has finished his conversation and that his line should be cleared. Any operator clears any cord immediately she sees the lamp above a plug light up. It is important to observe that the clearing-signal is given in the lamp of the calling subscriber only; but the clearing of his cord transfers, as herein described, this signal to the other or called-subscriber's lamp, and his cord is then cleared. Each section is fitted with one hundred pairs of cords. No. 1 operator, on the left, has in front of her on the cord-shelf all the "calling-cords" 124, (one hundred in number.) The fellow or "called cords" 125 are arranged in a similar manner in front of No. 2 operator, on the right. These are divided into groups of ten in both cases. All cords are provided with a supervisory lamp 126 and 126[a] and each group with a pilot-lamp 126[b] on the plug-shelf. Each cord on being lifted operates a cord-operated key, and each pair of cords has connected to it a clearing-relay, as 136, and a "set" of relays (three in number—the clearing control 135, the ringing 130, and the cut-off 134 relays) and a thermostatic device 131, which device constitutes an electrically-operated ringing-key. The exchange-generator 132 rings through vibrators 133, one being used on every group of ten connecting-cords. Each group of ten cords is provided with a "pilot-relay," which serves to complete circuit through the two pilot-lamps on the plug-shelf. A "main pilot-relay" or night-circuit relay 190, with night-lamp and night-bell 191, may be used on the calling-lamp circuit in the ordinary way for nightwork. Two twenty-four-volt batteries (the main battery and the reversed battery) are used, current being taken from the positive terminal of the one and from the negative of the other, the other poles being connected to earth. Incoming trunk-lines (see Fig. XXIX) are fitted and operated similarly to the subscribers' lines. Each outgoing trunk-line (see Fig. XXVIII) has a relay and a lamp for the purpose of clearing. Each section is provided with ten numerical indicators (one for each group of ten cords) which receive the impulses transmitted by the subscriber's instrument, and thus visibly indicate the number required, as hereinbefore described.

Metallic circuit is used, and I shall hereinafter refer to the two wires of the subscribers as the "A line" and the "B line," respectively.

I have now described the nature of all the devices among others comprised within my invention which are of special kind or form. With these it is necessary to employ other devices well known in the art, and I shall incidentally refer to these in the following description of the action of my invention.

*Method of operation.*—It will be understood from what has been said that at each exchange I have a single switchboard. Upon this switchboard there is located a spring-jack for each subscriber directly associated with the exchange in question. There is further a combined calling and clearing signal for each spring-jack. The operations are effected by a calling or No. 1 operator, who is assumed to stand at the left of the switchboard, Fig. XXXII[a], and by a called or No. 2 operator, who is assumed to stand at the right of the switchboard, Fig. XXXII[b]. Briefly describing the operation, the calling operator is notified that a subscriber wants a connection by the fact that the calling-lamp 23 adjacent to the subscriber's spring-jack is lighted. This is effected by the subscriber grounding his line in setting his latent signal-transmitter. The calling operator thereupon does one thing and one thing only, and that is to insert a plug 124 into the subscriber's jack. By this act two things are done—first, the supervisory lamp 126[a] of the corresponding called plug is lighted and, second, the number which the calling subscriber has set on his instrument is transmitted and made visible on the numerical indicator at the right of the switchboard. The called operator No. 2 thereupon inserts the called plug corresponding to the supervisory lamp which has been lighted into the spring-jack of the called subscriber, whose number has been indicated on the annunciator. The bells of the calling and called subscribers are thereby automatically caused to ring. The subscribers take their telephones off their hooks and talk. The conversation being finished and the telephones hung up, the clearing-out signal is given by having the calling-lamp of the calling subscriber glow. The calling operator thereupon takes the calling-plug out of its spring-jack and returns it to its seat. By this act the called-subscriber's lamp is caused to glow, whereupon the called operator withdraws the called plug from its jack, and the operation is finished.

Coming now to a detailed description of the operation thus far outlined, I find that under normal conditions the subscriber's A line is connected to earth through a contact 120 on the switch-hook of his instrument and through the bell 032, which is thus ready to receive a call. When the subscriber wants another subscriber, he sets his latent signal-transmitter to the number wanted, winds up this signal-transmitter to store enough energy for several signals, and grounds his B line through the contact 29[e], as before described. In this way a circuit is formed from earth 01 through the one-hundred-ohm release-coil 02, contact 8, contact 29[e], wire 04, switch-hook contact 05, wire 06, spring-jack 07, wire 08, the two-thousand-ohm calling-relay 122, wire 09, to battery 123 and earth 010. The presence of the two-thousand-ohm calling-relay in this circuit prevents the operation of the one-hundred-ohm release-coil 02.

The calling-relay 122 nevertheless closed a circuit for lighting the calling-lamp, which may be traced as follows: from earth 011 through contact 012, resistance 160, wire 013, lamp 23, to battery 123 and earth 010.

The No. 1 operator now sees the calling-lamp 23 over the calling-subscriber's spring-jack 121[a] glowing and inserts a calling-plug 124 into this spring-jack 121[a]. He thereby breaks the circuit including the calling-relay at the spring 07 and extinguishes the calling-subscriber's lamp. At the same time he establishes a circuit through the numerical indicator 24, as follows: from the earth 01, release-coil 02, contact 8, contact 29[e], wire 04, wire 06, jack-spring 014, collar 015 of plug 124, wire 016, wire 017, plug-contact 018, wire 019, retarding-relay 80 of twenty-five ohms resistance, wire 020, wire 021, contact-spring 77[f] through the commutator to contact 77[a], wire 022, wire C, to battery 123 and earth 010. Since this circuit excludes the high-resistance relay 122 and passes through the subscriber's detent-relay 02, it follows that this detent-relay is actuated and the subscriber's signal is released.

At the same time the retarding-relay 80 is actuated, closing circuit at 83 through the commutator-relay. This circuit through the commutator-relay may be traced as follows: from earth 81[a], contact 83, armature 81, commutator-relay 71, wire 023, wire *c*, battery 123, and earth 010. The energization of the commutator-relay steps the commutator along and causes the spring 77[f] to break contact and the spring 77[e] to make contact, thus connecting up the first magnet 57 of the numerical indicator into the line which has been just traced and which runs through the retarding-relay, the plug-switch contact 018 to the subscriber's station, and through his latent signal-transmitter to ground. The short makes and breaks of the transmitter coming over the line thus cause the actuation of the first magnet of the numerical indicator and step the first drum of the indicator into position.

The commutator-contacts 10 of the subscriber's latent signal-transmitter are arranged in separate groups divided by a long space between the groups. It follows that when the revolving contact-brush is traveling over these spaces no impulses are sent. The armature 81 of the retarding-relay 80 at each long break between the groups gives a step to the commutator-relay by cutting off connection with the earth 81[a], which step connects the next magnet 57 of the numerical indicator into the circuit leading to the subscriber's latent signal-transmitter. The second group of subscriber's signals thus actuates the second magnet 57, and thereby the second drum of the numerical indicator. When all the drums of the numerical indicator have been actuated, the lamps 128 within the drums are lighted by a contact 77[g] on the last step of the commutator-relay.

It will thus be seen that the retarding-relay and the commutator-relay together constitute an electromagnetic distributer. This distributes the separate groups, which taken together compose the subscriber's signal to the set of indicators—in this case drums—which together constitute the numerical indicator.

The removal of the calling-operator's plug from its seat has thrown spring 025 into contact with a coöperating spring connected to earth, thus closing the circuit from earth 024, to spring 025, to wire L, to spring 129[c], wire K, supervisory lamp 126[a], wire 026, battery 123, and earth—that is to say, while the act of the calling operator in plugging into the spring-jack of a calling subscriber has extinguished the subscriber's lamp 23 and has put into circuit and caused the actuation of the numerical indicator through the release of the latent signal-transmitter the preliminary act of the calling operator in removing the calling-plug from its seat has lighted the supervisory lamp corresponding to the called plug, which is electrically connected with the calling-plug in question.

It is therefore apparent that the called or No. 2 operator, having read the indicated number on the numerical indicator, will now take the connecting-plug corresponding to the supervisory lamp which has been lighted out of its socket and will insert it in the jack of the subscriber or trunk line indicated as wanted. The lifting of the called plug 125 out of its seat will, first, break the circuit of the supervisory lamp 126[a] at 129[c]. This is as it should be. Second, the lifting of this plug will break at 018 the circuit which runs through the retarding-relay and the numerical indicator to ground. This means that the numerical indicator, being no longer needed, is cut out of the called circuit by the lifting of the called plug. This is also as it should be. Third, the called operator, having inserted the called plug into the spring-jack asked for, presses the restoring-lever 67, Fig. XVII, of the numerical indicator, returning its several dials to normal and closing contact at 127. A circuit is hereby established from earth 027 through contact 127, wire 028, commutator-relay 71, wire 023 wire C, battery 123, and earth 010. A final step is thus given to the commutator-relay, extinguishing the lamps 128 and placing the relay in its initial position to receive another call.

But the insertion of the called plug into the called jack has done more. It has completed the circuit from the battery 123, line 09, lamp 23, wire 013, bush 121[a], sleeve 125[a], line Z, ringing-relay 130, polarized relay 146, (which remains unactuated by the direction of current passing,) contact Y to ground X. The actuation of the ringing-relay closes contact at U and causes a current to pass from ground N through the generator 132, vibrator 133, contact V, contact U, line T to the A line, and thence in parallel to the grounds over the called bells of both subscribers—that is to say, the mere act of inserting the called plug into the called jack, among other things, causes both subscribers' bells to ring.

I have now to describe the means which stop the bells from ringing after a predetermined time. The actuation of the ringing-relay has caused the contact to be closed at 1300. A current now passes from the earth 010 through the battery 123, wire 029, the coil of the thermostat, the contact 1300 to ground X. After a predetermined time the thermostat closes a circuit at 030 and current passes from ground 010 through battery 123, wire 029, contact 030, wire S, clearing-control relay 135, wire R, wire T, wire A, a spring-jack 121, wire 031, through the bell 032 to ground.

That is to say, the action of the thermostat by closing contact at 030 after a certain time actuates the clearing-control relay 135. This controlling-relay now operates to close circuit at 137, establishing a circuit from earth N, through contact 137, cut-off relay 134, wire Z, plug-sleeve 125[a], bush 121[a], wire 013, lamp 23, wire 09, battery 123, and earth 010. The cut-off relay 134 being energized breaks contact at Y, thus breaking the circuit of the ringing-relay 130, which ringing-relay 130 being deënergized the circuit of the ringing-generator 132 is broken at U and the subscribers' bells stop ringing.

Summarized, the last paragraph amounts to this, that when the called plug is inserted into the called socket a thermostat makes contact at 030 through a clearing controlling relay 135, which in turn closes a circuit at 137 through the cut-off relay 134, which breaks at Y the circuit through the ringing-relay 130. The deënergization of the ringing-relay breaks at U the circuit of the calling-generator, and thus stops the subscribers' bells from ringing. What is more, the cut-off relay 134 on being energized closes a locking-circuit through itself, so that the cut-off relay remains energized throughout the conversation and until the plugs are withdrawn, and the subscribers cannot be called up during their conversation. This locking-circuit is traced as follows: from earth at X through contact M, cut-off relay 134, wire Z, plug 125[a], called lamp 23, line 09, battery 123, and earth 010.

On the other hand, the clearing control-relay 135 does not remain energized during conversation, but only until both subscribers have taken their telephones from their hooks, after which it becomes deënergized. This is effected by having the first energization of the clearing control-relay 135 establish a contact at 138[a], thus closing a circuit from earth 010, through battery 123, wire Q, contact P, wire O, contact 138[a], relay 135, wire R, wire T, line-wire A to earth through the subscribers' bells. It will be seen, therefore, that the clearing control-relay 135, irrespective of the deënergization of the thermostatic device, remains energized until both subscribers take their telephones off their hooks, after which time it remains deënergized. In this way the clearing-relay 136 has its circuit broken at 138 until the subscribers are conversing.

In order to permit the operator to know that both subscribers are conversing, I cause the armature of the clearing control-relay 135 to close at 141 a circuit through the supervisory lamp 126[a] to the battery 123 and the ground 010. When the lamp is extinguished, the operator knows that the clearing control-relay has been deënergized, which means that both subscribers have taken their telephones off their hooks. If the subscribers do not answer promptly, the operator rings again by withdrawing the plug and reinstating it, thereby operating the ringing-relay a second time.

During conversation all the lamps appertaining to the pair of cords used and the two subscribers' lamps are thus seen to be extinguished, but current is passing in series through the locking-circuit containing the called-subscriber's lamp 23 and the cut-off relay 134, the high resistance of this relay preventing the lamp from glowing. What is more, the clearing-relay is in a forked ground-tap from battery 123 to earth through the subscribers' bells, which forks are broken at the bells so long as the telephones are off their hooks. This forked ground-tap will be traced in the next paragraph.

The subscribers having finished their conversation and hung up their telephones, thus connecting their bells to the A lines, the clearing-relay is energized by a circuit which may be traced as follows: from earth 010, battery 123, wire Q, contact P, wire O, contact 138, clearing-relay 136, contact 034, wire T, line-wires A, jacks 121 of both subscribers in forks to line-wires 131, through bells to earth. The clearing-relay 136 being operated causes current to pass from the ground N N to the collar of the plug, which connects with the bush 121[a] of the calling-subscriber's jack, and thence over wire 013, lamp 23, battery 123 to ground—that is to say, the operation of the clearing-relay lights the lamp 23 adjacent to the calling-subscriber's spring-jack.

The operator now takes the calling-plug out of the calling-jack, and the dropping of this plug to its seat connects a resistance-coil 142 in shunt with the cut-off relay 134 in the locking-circuit. This shunt runs from the line Z to the resistance 142 and earth 024 instead of through the relay 134, contact M, and ground X—that is to say, the battery 123 in the locking-circuit instead of going only through the relay 134, contact M, and ground X now passes as well through the resistance 142 to ground 024. The lamp 23 of the called subscriber in the locking-circuit is thereby caused to glow. The called plug is then withdrawn from the called jack, which breaks the locking-circuit for the cut-off relay, and all the parts are seen to have been returned to their normal positions with the operations finished.

I have now described in detail the various operations as they normally occur. I have shown what each relay and each part does and how it does it.

But it may happen that the called subscriber wanted is engaged. In this case, as each subscriber has only one jack at the switchboard, the called operator at once sees that it is plugged, and it is merely necessary to inform the calling-operator of this fact. This is done by inserting the connecting-plug 125 into the projecting-jack of Fig. XXX. This jack is so constructed as to cause one polarity of current to pass through the ball of the plug 149 when it is entirely inserted and another polarity to pass when the plug is but part way inserted. Thus when the plug 149 is entirely inserted in the projecting-jack, so that the tip of the plug touches the spring 171, there is a circuit from ground, through the reversed battery, spring 171, tip of plug 149, the A wire of the cord-circuit, the tip of the connected plug, spring 121, (Fig. XXXI[a],) wire 031, and subscriber's bell to earth. In this way insertion of the plug in the projecting-jack causes the subscriber's bell to give a single stroke, and the impulse from the reversed battery passing through the bell-magnet of the subscriber's instrument moves the jaw-ladder of the annunciator a single step and causes a proper signal to be displayed by the annunciator. The called operator having released his hold of the plug 149 in the projecting-jack, the tip of the plug now contacts with the spring 170, forming a circuit from earth, through the direct battery, spring 170, tip of plug 149, the A wire of the cord, (Fig. XXXI[b],) wire T, contact 034, clearing-relay 136, contact 138, armature 140, wire O, resistance-lamp R to earth. The lamp 23 over the calling-subscriber's jack is thus caused to glow by actuation of relay 136, as will now be readily understood, and No. 1 operator clears.

Should the wanted subscriber be on a distant exchange, the operations are as before, with the exception that to extend the call to another exchange the connecting-plug is inserted into a jack 143 of an outgoing trunk-line (see Fig. XXVIII) to that exchange, and the further progress of the call is dealt with entirely by the operators at the distant exchange. The lamp 144 on the outgoing trunk is connected to the reversed battery 145—that is to say, the battery giving opposite polarity—so that the relay 130, the thermostatic device 131, and the cut-off relay 134 operate as before, but the polarized relay 146 is affected by the reverse current and breaks the generator-circuit 132, so that the other relays are in a precisely similar state as for local calls; but the subscribers' bells have not yet been rung. The other relays just mentioned thus take care of the clearing operations just as if the two subscribers were at the same exchange, leaving the ringing operation for the distant exchange.

It will be understood that these relays, being on the third wire of the cord, do not disturb the line-circuit while the call is being further dealt with at the distant exchange, only the clearing control-relay 135 being connected to the A line, as before.

At the distant exchange the call is indicated by the calling-lamp 147 on the in coming trunk-line 148 glowing. The wiring on the incoming trunk-jack 148 is precisely the same as that on the subscriber's jack, so that a call is indicated through the originating-exchange from the subscriber's instrument. The operators at the distant exchange treat the call in all respects as in the previous case.

If necessary, the call can be similarly extended through a third exchange. When a call is through two or more exchanges and the wanted subscriber is engaged, No. 2 operator at the last (most distant) exchange inserts the connecting-plug 149 into the projecting jack. (See Fig. XXX.) This jack causes the plug to make contact with the reversed battery 145, thus giving the appropriate indication at the subscriber's annunciator, as was described four paragraphs above, when the line was in use and there was but a single exchange. The plug is then projected and remains at rest with the A line in contact with the main battery 123, the current from which releases the clearing control-relay 135 in the originating-exchange. This is true because the clearing control-relay 135 at the originating-exchange has been left in a ground-tap from the A line through the direct battery to earth, as was described ten paragraphs above for the case of a single exchange, and the connection of another ground-tap with the direct battery to the A line at the distant exchange neutralizes the two batteries and short-circuits the clearing control-relay 135 at the originating-exchange. This thereupon releases its armature and by contact 138 connects the clearing-relay 136 to the A line, which thus attracts its armature and lights a lamp 23 at the calling-jack in the originating-exchange, as was described four paragraphs above in the case of a "busy" condition in a single exchange. The calling operator in the originating-exchange is thus notified to clear, and his act of clearing notifies the called operator at the originating-exchange to clear, as in the case of a single exchange. On the other hand, the plug at the distant exchange remains in the projecting jack and the current from the direct battery 123 gives the clearing-signal to the calling-plug at the distant exchange, as has been described four paragraphs above when referring to the corresponding operation in a single exchange.

It will be seen that my telephone-exchange system is practically automatic for all operation except the plugging of the jacks of the calling and called subscribers. What is more, the construction is about as simple as the operation. The subscriber has the usual call-bell, telephone receiver and transmitter, and the device for storing signals or holding signals latent. These parts taken together I call a "subscriber's latent-signal set."

There is a single switchboard at each exchange, upon which switchboard are found all the spring-jacks of the group of subscribers associated with that exchange. Furthermore, there is a subscriber's lamp adjacent to each jack. I use the word "lamp" in a sense broad enough to cover any signal device. I may also supply the switchboard with incoming trunking-jacks and with outgoing trunking-jacks. I have calling-plugs normally resting in plug-switches at the left, say, and called plugs normally resting in plug-switches at the right, say, of the switchboard. There are supervisory lamps for the plugs. Finally, I have a numerical indicator at the called board upon which is registered the entire signal stored in the subscriber's latent-signal transmitter by the mere act of plugging the calling-plug into the calling-jack. The called operator is thus notified of the number wanted by the mere act of the calling operator in plugging into the calling-jack. Thereupon the simple act of putting the called plug into the called jack rings the subscribers' bells. Conversation having been finished, the glowing of the calling-subscriber's lamp tells the calling operator to withdraw his plug. The calling-plug having been returned to its seat, the called-subscriber's lamp glows. The called plug is then withdrawn from the called jack.

I claim—

1. A telephone-exchange comprising a subscriber's latent-signal set including a signal-transmitter arranged to send its signal in groups, with current changes between the groups, a switchboard with subscribers' jacks, calling-plugs and called plugs, a numerical indicator at the switchboard in the plug-circuit comprising a set of actuating-magnets, a commutator-relay to successively throw them into circuit, and a relay operated by the current changes to actuate the commutator-relay, these parts being set into operation by the plugging of the calling-plug into the calling-subscriber's jack, to indicate to the called operator the signal which has been set, substantially as described.

2. A telephone-exchange comprising a subscriber's latent-signal set, a switchboard with subscribers' jacks, calling-plugs, calling-plug switches, called plugs, a supervisory lamp for the called plug in circuit with the calling-plug switch, and a numerical indicator in the plug-circuit, whereby the removal of the calling-plug from its plug-switch and the plugging of the calling-plug into the calling-subscriber's jack, lights the supervisory lamp at the called plug and actuates the numerical indicators to register the latent signal, substantially as described.

3. A telephone-exchange comprising a subscriber's latent-signal set including a signal-transmitter, arranged to send signals in groups with current changes between the groups, a switchboard with subscribers' jacks, calling-plugs, called plugs, a numerical indicator in the plug-circuit, comprising a set of actuating-magnets and a circuit-changing restoring device, a commutator-relay to successively throw the magnets into circuit, and a relay operated by the current changes to actuate the commutator-relay, the parts being set into operation by the plugging of the calling-plug into the calling-subscriber's jack to indicate to the called operator the signal set, and the commutator-relay being returned to normal by the circuit-changer of the restoring device, substantially as described.

4. A telephone system comprising a subscriber's latent-signal transmitter arranged to store a plurality of identical signals, two exchanges each comprising a switchboard with subscribers' jacks, trunking-jacks, calling-plugs, called plugs and a numerical indicator, energized by the plugging of a calling-plug into the calling-subscriber's jack, whereby the first calling-operator may register the stored signal on the first switchboard, the first called operator may trunk to the second exchange, and the second calling operator may again register the stored signal at his board, substantially as described.

5. A telephone-exchange comprising a subscriber's latent-signal set arranged to send its signals in separate groups, a switchboard with subscribers' jacks, calling-plugs, called plugs, an electromagnetic distributer, and a numerical indicator comprising a set of indicators, energized by the plugging of a calling-plug into the calling-subscriber's jack to simultaneously indicate to the called operator the several elements of the signal set on the subscriber's latent-signal transmitter, substantially as described.

6. A telephone-exchange comprising a subscriber's latent-signal set arranged to send its signals in separate groups, a switchboard with subscribers' jacks, calling-plugs, called-plug switches, called plugs therein, an electromagnetic distributer for distributing the several groups constituting a signal, and a numerical indicator, comprising a set of indicators, in the circuit passing through the called-plug switches, energized by plugging the calling-subscriber's plug into his jack, whereby the raising of the called plug from its called-plug switch cuts the numerical indicator out of circuit, substantially as described.

7. A telephone system comprising subscribers' latent-signal sets each arranged to store the entire number of the subscriber wanted, a switchboard having subscribers' jacks, subscribers' signals therefor, calling-plugs, called plugs, and a numerical indicator energized by the single act of plugging the calling-plug into the calling-jack to register the entire latent signal which has been set, whereby the operator's telephone and key are dispensed with in getting the number of the subscriber wanted, substantially as described.

8. A telephone system of the type which dispenses with any necessary verbal communication between the subscribers and the central-office operators, comprising latent-signal sets at the subscriber's station, a switchboard having subscribers' jacks, and subscribers' signals therefor, calling-plugs, called-plug switches and called plugs therein and a numerical indicator, to register the latent signal, in the circuit passing through the called-plug switches, energized by the single act of plugging the calling-plug into the calling-subscriber's jack, whereby the raising of the called plug from its called switch cuts the numerical indicator out of circuit, substantially as described.

9. A telephone system of the type which dispenses with any necessary verbal communication between the subscribers and the central-office operators and in which the ringing of the subscribers' bells is effected by the operator's act of completing the connection comprising subscribers' latent-signal sets including bells or the like, a switchboard with subscribers' jacks, calling-plugs, called plugs, a numerical indicator energized by the latent-signal set and cut out of circuit through action of the called plug, and a ringing-generator put into action by a circuit including the called plug and jack, whereby the called-operator's act of completing the connection indicated by the numerical indicator cuts the numerical indicator out of circuit and rings the subscriber's bells, substantially as described.

10. A telephone system comprising subscribers' latent-signal sets each arranged to store the entire number of the subscribers wanted, a switchboard having subscribers' jacks, subscribers' signals therefor, calling-plugs, called plugs, a numerical indicator energized by the single act of plugging the calling-plug into the calling-jack to register the entire latent signal which has been set, and a ringing-generator put into action by means of a circuit completed through the called plug and called jack; whereby the mere plugging of the calling-jack informs the called operator of the subscriber wanted, and the mere plugging of the called jack completes the connection and rings the subscribers' bells, substantially as described.

11. A telephone system of the type which dispenses with any necessary verbal communication between the subscribers and the central-office operators and in which the ringing of the subscribers' bells is effected by the operator's act of completing the connection comprising subscribers' latent-signal sets including bells or the like, a switchboard with subscribers' jacks, calling-plugs, called plugs, a numerical indicator energized by the latent-signal set and cut out of circuit through the action of the called plug, a ringing-relay having a circuit through the called plug and jack, a cut-off relay therefor and a locking-circuit for the cut-off relay which remains energized during the conversation, substantially as described.

12. A telephone system of the type which dispenses with any necessary verbal communication between the subscribers and the central-office operators comprising subscribers' latent-signal sets, a switchboard with subscribers' jacks, subscribers' signals, calling-plugs, calling-plug switches, called plugs, a numerical indicator at the switchboard for the latent signals, a circuit including a called-subscriber's signal inactive during conversation, and means controlled by the return of the calling-plug to its switch for rendering said signal active, whereby the return of the calling-plug to its switch gives the clearing-signal to the called operator, substantially as described.

13. A telephone system of the type which dispenses with any necessary oral communication between the subscribers and the central-office operators comprising subscribers' stations, apportioned between two or more exchanges, having latent-signal sets for actuating numerical indicators; two or more exchanges each having a switchboard, subscribers' jacks, trunking-jacks with a reversed battery connected thereto, calling-plugs, called plugs, a numerical indicator, and a non-polarized ringing-relay and a polarized relay on a circuit which is completed through the called plug and jack, whereby the insertion of the called plug into the called jack of a subscriber apportioned to the same exchange rings the subscribers' bells by actuating the ringing-relay, but insertion into the trunking-jack for the distant exchange does not ring these bells because of the actuation of the polarized relay by the reversed battery, substantially as described.

14. A telephone-exchange of the type which dispenses with any necessary verbal communication between the subscriber and the central-office operators, comprising subscribers' latent-signal sets arranged to store a multiplicity of identical signals, a switchboard at the exchange having subscribers' jacks, calling-plugs, and called plugs, and a numerical indicator controlled by the latent-signal transmitter to indicate, successively, the identical signals stored therein, substantially as described.

15. A telephone-exchange of the type which dispenses with any necessary verbal communication between the subscriber and the central-office operator, comprising subscribers' latent-signal ~~sets, arranged~~ to store a multiplicity of identical signals, a switchboard for subscribers' lines at the exchange, a numerical indicator controlled by the latent-signal transmitter to indicate, successively, the identical signal stored therein, and a restoring device to reset the indicator between the reception of identical signals, substantially as described.

ARTHUR T. M. THOMSON

Witnesses:

F. BARNES,

G. O. ELLIS.